United States Patent
Feldstein (10) Patent No.: US 8,190,095 B1
(45) Date of Patent: May 29, 2012

(54) RF AUDIO DISTRIBUTION SYSTEM INCLUDING IR PRESENCE DETECTION

(75) Inventor: George Feldstein, Cresskill, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 134 days.

(21) Appl. No.: 12/778,699

(22) Filed: May 12, 2010

Related U.S. Application Data (63) Continuation-in-part of application No. 12/466,854, filed on May 15, 2009.

(51) Int. Cl.
*H04B 7/00* (2006.01)
(52) U.S. Cl. .......... 455/66.1; 455/41.2; 455/41.3
(58) Field of Classification Search ............ 455/41.2, 455/41.3, 66.1, 456.1, 418, 419
See application file for complete search history.

(56) References Cited

U.S. PATENT DOCUMENTS

| | | | |
|---|---|---|---|
| 7,016,325 B2 | 3/2006 | Beasley | |
| 7,151,764 B1 | 12/2006 | Heinonen | |
| 7,509,417 B1 | 3/2009 | Kammer | |
| 2002/0142771 A1 | 10/2002 | Saifullah | |
| 2004/0106377 A1* | 6/2004 | Van Der Winkel et al. | 455/41.2 |
| 2008/0227393 A1* | 9/2008 | Tang et al. | 455/41.3 |
| 2009/0125984 A1 | 5/2009 | Bilger | |

* cited by examiner

*Primary Examiner* — Lewis West
(74) *Attorney, Agent, or Firm* — Crestron Electronics Inc.

(57) ABSTRACT

A wireless communication access point is provided with an infrared beacon transmitter to signal a connection request to a portable wireless device, such as a microphone, using an IR room code. In response to this IR room code, the portable wireless device broadcasts a RF inquiry message that is responded to by the wireless communication access point in order to establish a RF communication link. After the RF communication link is established, the wireless communication access point periodically transmits the IR room code to verify that it is still collocated in the local vicinity of the portable wireless device, such as being in the same room.

30 Claims, 7 Drawing Sheets

RF AUDIO DISTRIBUTION SYSTEM INCLUDING IR PRESENCE DETECTION

CROSS REFERENCE TO RELATED APPLICATIONS

This application is a continuation-in-part of pending application U.S. Ser. No. 12/466,854, filed on May 15, 2009, and which is hereby incorporated by reference.

BACKGROUND OF THE INVENTION

1. Technical Field

The present invention relates to networks of devices that can be connected using wireless links. Specifically, embodiments of the present invention pertain to a method and system for selecting and connecting to wireless access point within a local area network.

2. Background Art

Figure 1:
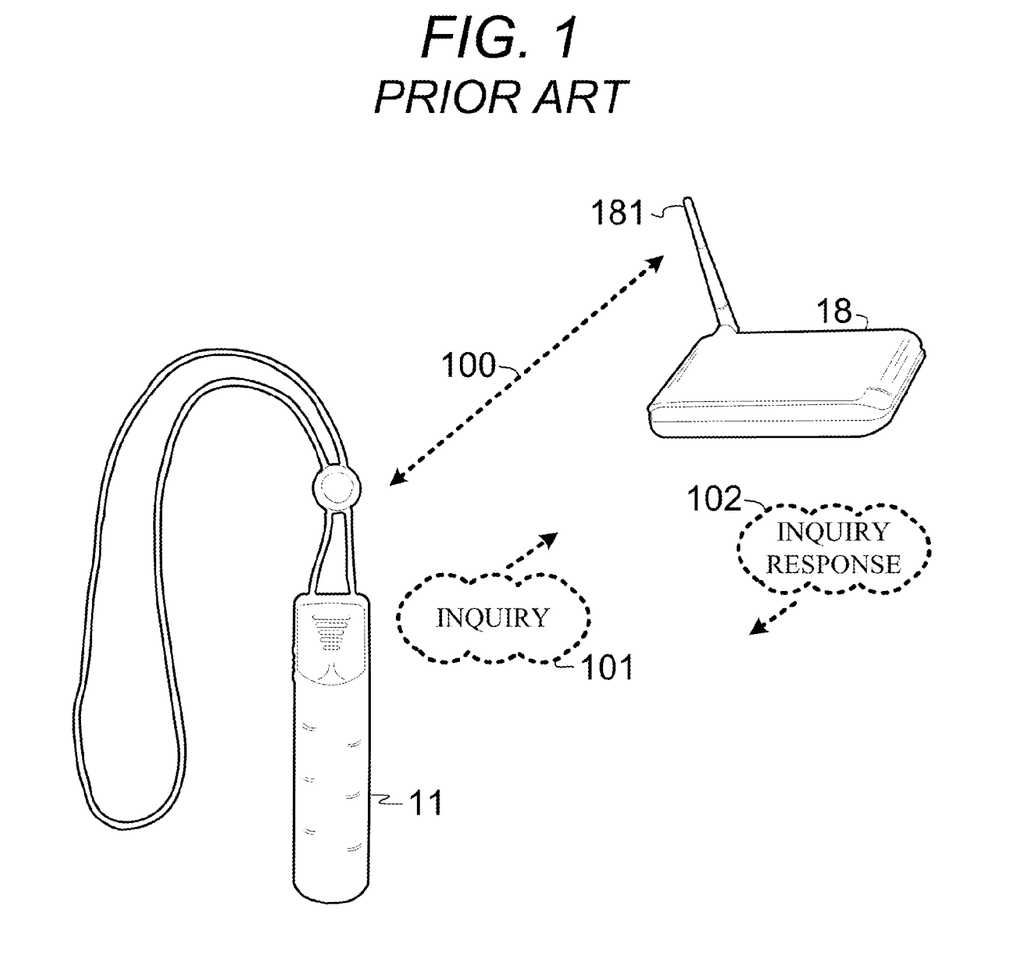
FIG. 1 depicts a wireless microphone using radio frequency (RF) digital protocol to transmit an audio signal to a wireless audio access point.

Prior art FIG. 1 depicts a radio frequency (RF) wireless microphone 11 that is sending audio, via a RF communication link 100, to a wireless audio access point 18. This application is suitable for a teacher, using this wireless RF microphone 10, to address students in a classroom setting. Audio distribution using wireless RF communication is well understood in the prior art. Similar transmission methods using known RF communication protocols are also well understood in the art. For example, Bluetooth® is one such method. Bluetooth is a trademark of Bluetooth SIG, Inc. Wi-Fi® devices communicate using the IEEE 802.11 standards. Wi-Fi is a trademark of the Wi-Fi Alliance. It is also well known in the prior art to use IEEE 802.11 in conjunction with Internet Protocol to wirelessly transmit audio data, such as in Voice over Internet Protocol (VoIP) applications.

One recent advance in wireless RF communication is Wi-Fi Direct, a wireless standard that allows Wi-Fi devices to communicate directly with each other without the need for a router. This peer-to-peer communication standard can be implemented in any Wi-Fi device. Those skilled in the art will recognize the advantages of transmitting audio data directly from a wireless microphone to a wireless audio access point in accordance with the Wi-Fi Direct specification.

Wireless RF communication can be established by a device, such as a RF wireless microphone 11, by first broadcasting an inquiry message 101 to a wireless audio access point 18 which responds by broadcasting an inquiry response message 102.

Figure 2:
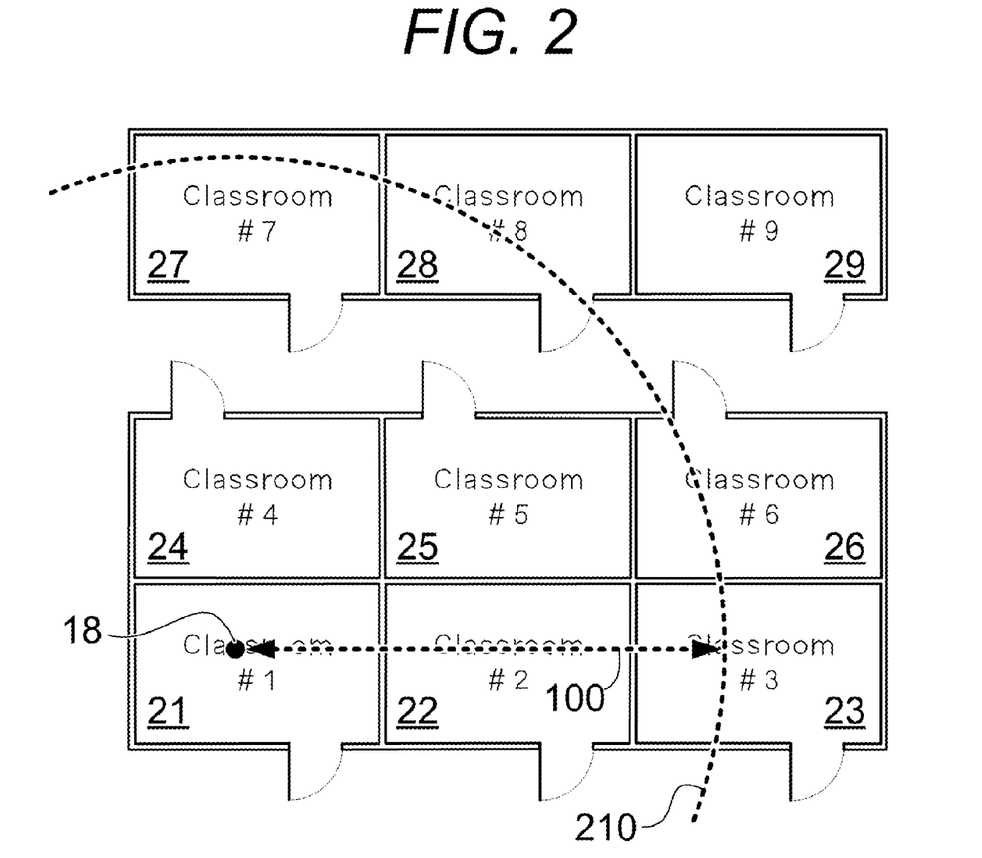
FIG. 2 depicts a portion of a school building having several classrooms and with the wireless range of a typical RF device thereupon superimposed.

FIG. 2 depicts a portion of a school building having several classrooms with the range of a typical wireless device thereupon superimposed. This clearly shows that in a school setting, the range 210 of a typical wireless device, such as wireless audio access point 18, located in a first classroom 21 extends well beyond the confines of that classroom. As shown, the wireless audio access point 18 located in the first classroom 21 would try to establish RF communication 100, with any compatible wireless devices located in a second classroom 22, a fourth classroom 24, and a fifth classroom 25. The wireless audio access point 18 also potentially interacts with some portion of the devices in a third classroom 23, a sixth classroom 26, a seventh classroom 27, and an eighth classroom 28. In fact, in the typical school layout illustrated only devices in a ninth classroom 29 would not interact with the wireless audio access point 18 in the first classroom 21.

The prior art does not provide an effective means of limiting wireless communications to the confines of a single classroom. The problems associated with employing a wireless microphone device in a multiple classroom setting are compounded when multiple wireless microphones are employed. For example, envision a classroom setting with both a teacher microphone and multiple student microphones. The solution to the original problem must now take into account the additional issues of interference, coordination and interoperability.

SUMMARY OF THE INVENTION

It is to be understood that both the general and detailed descriptions that follow are exemplary and explanatory only and are not restrictive of the invention.

DISCLOSURE OF INVENTION

Accordingly, a need exists for a classroom audio system that allows a teacher to move between several classrooms and retain use of his/her personal wireless microphone. A need also exists for a system and/or method that can satisfy the above need. The embodiments of the present invention provide these advantages and others not specifically mentioned above but described in the sections to follow.

According to a first aspect, the present invention provides a wireless communication system comprising a wireless communication access point and a portable wireless device. The wireless communication access point further comprises a radio frequency digital transceiver and an infrared beacon transmitter configured for transmitting an infrared beacon signal at a data rate greater than or equal to 400 baud and less than or equal to 9600 baud. The portable wireless device further comprises a radio frequency digital transceiver configured for communicating with the radio frequency digital transceiver of the wireless communication access point and an infrared sensor configured for receiving the infrared beacon signal. The portable wireless device manages radio frequency digital communications based on the infrared beacon signal.

According to a second aspect, the present invention provides a wireless communication system for use in a classroom setting comprising a wireless audio access point and a RF wireless microphone. The wireless audio access point further comprises a radio frequency digital transceiver and an infrared beacon transmitter configured for periodically transmitting an IR room code. The RF wireless microphone further comprises a radio frequency digital transceiver, an infrared sensor, and a microphone element. The RF wireless microphone and the wireless audio access point are configured for: establishing mutual radio frequency communication only after the IR room code is detected at the portable wireless device; terminating radio frequency communication upon a first predetermined condition of failing to receive the IR room code and reestablishing RF communication upon a second predetermined condition of receiving the IR room code. The RF wireless microphone is further configured for muting an audio output from the microphone element upon a third predetermined condition of failing to receive the IR room code and enabling audio from the microphone element upon a fourth predetermined condition of receiving the IR room code.

According to a third aspect, the present invention provides a method for selectively communicating with a portable wireless device capable of wireless reception and transmission on multiple RF communication channels as it moves throughout a predefined area. The method comprises the steps of: providing the portable wireless device; providing a plurality of wireless communication access points located throughout the predetermined area, with each one of said wireless communication access points being located at a corresponding predetermined position, being capable of wireless reception and transmission on multiple RF communication channels, and being capable of transmitting IR codes; transmitting a first IR room code from a first wireless communication access point to the portable wireless device, the first IR room code comprising an infrared beacon signal at a data rate of between 400 and 9600 baud; selecting a first RF communication channel based on the contents of the first IR room code; establishing communication between the portable wireless device and the first wireless communication access point on the first RF communication channel.

According to a fourth aspect, the present invention provides a method for selectively distributing audio from a wireless microphone to an audio distribution component. The method comprises the steps of providing the wireless microphone, which is capable of communicating over a RF communication channel, including being capable of transmitting audio data and being capable of receiving infrared beacon signals; providing the audio distribution component, which is capable of communicating over a RF communication channel, including being capable of receiving audio data, and being capable of transmitting infrared beacon signals; periodically transmitting an IR room code, which is configured to facilitate communication over the RF communication channel between the wireless microphone and the audio distribution component, from the audio distribution component to the wireless microphone; establishing communication over the RF communication channel between the wireless microphone and the audio distribution component; conditionally muting audio from the wireless microphone upon a first predetermined condition of not receiving the IR room code at the wireless microphone; conditionally enabling audio from the wireless microphone upon a second predetermined condition of receiving the IR room code at the wireless microphone; conditionally terminating communication over the RF communication channel upon a third predetermined condition of not receiving the IR room code at the wireless microphone; and conditionally reestablishing communication over the RF communication channel upon a fourth predetermined condition of receiving the IR room code at the wireless microphone.

The present invention seeks to overcome or at least ameliorate one or more of several problems, including but not limited to: using a RF wireless microphone in multiple classrooms.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

Prior art

LIST OF REFERENCE NUMBERS FOR THE MAJOR ELEMENTS IN THE DRAWING

The following is a list of the major elements in the drawings in numerical order.

11 radio frequency (RF) wireless microphone
18 wireless audio access point
21 first classroom
22 second classroom
23 third classroom
24 fourth classroom
25 fifth classroom
26 sixth classroom
27 seventh classroom
28 eighth classroom
29 ninth classroom
41 portable wireless device
48 wireless communication access point
49 controllable device
100 RF communication link
101 RF inquiry
102 RF inquiry response
181 antenna (p/o wireless audio access point 18)
210 range of RF device (from classroom 21)
400 infrared beacon signal
401 infrared (IR) Room Code (carried on infrared beacon signal 400)
402 remote control command
411 antenna (p/o portable wireless device 41)
412 remote control buttons (p/o portable wireless device 41)
413 infrared sensor (p/o portable wireless device 41)
415 RF transceiver (p/o portable wireless device 41)
417 microphone element (p/o portable wireless device 41)
481 antenna (p/o wireless communication access point 48)
483 infrared transmitter (p/o wireless communication access point 48)
485 RF transceiver (p/o wireless communication access point 48)
487 audio output circuitry (p/o wireless communication access point 48)
700 process flowchart
701 (step of) transmitting an IR room code
702 (step of) establishing RF communication link
703 (step of) transmitting the IR room code
704 (condition) is the IR room code missing? (at sensor 413)
705 (step of) conditionally muting audio
706 (condition) is the IR room code still missing? (at sensor 413)
707 (step of) conditionally enabling audio
708 (step of) conditionally terminating RF communication link

DETAILED DESCRIPTION OF THE INVENTION

The embodiments of the present invention are described primarily in the context of a classroom audio distribution system that includes a number of wireless audio access points that may be in relatively close vicinity to one another and multiple wireless microphones. The wireless microphones and wireless audio access points establish an audio distribution system via infrared and radio frequency communication.

Mode(s) for Carrying Out the Invention

Embodiments of the present invention are described herein in the context of devices and systems which are coupled using wireless links but are not limited thereto, except as may be set forth expressly in the appended claims.

Figure 3:
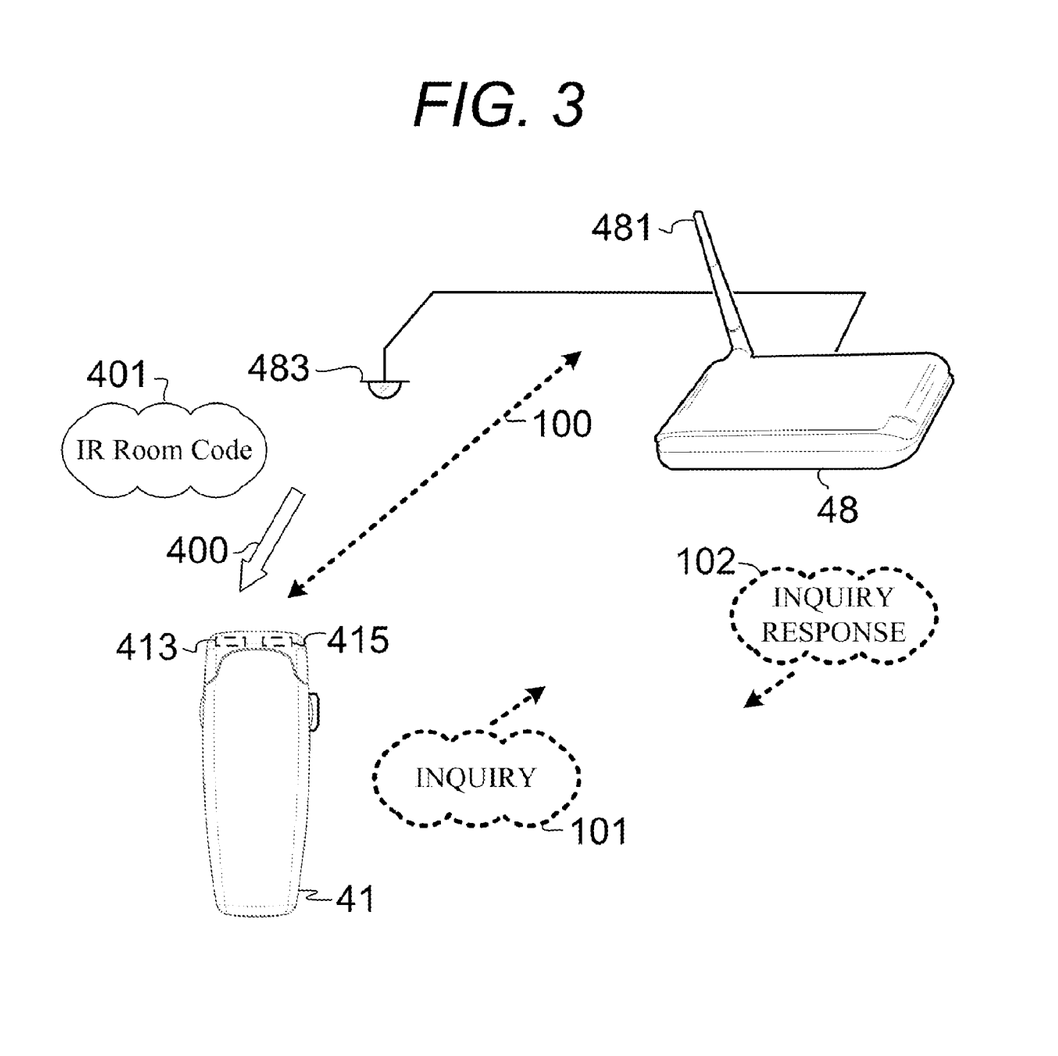
FIG. 3 depicts a classroom audio presentation system that uses a wireless audio access point and a RF wireless microphone that further includes an infrared sensor for presence detection in accordance with one illustrative embodiment of the present invention.

Refer to FIG. 3. The present invention can be embodied as a wireless classroom audio presentation system that includes at least one portable wireless device 41, such as a radio frequency (RF) wireless microphone, that works in conjunction with a wireless communication access point 48, such as a wireless audio access point.

This wireless audio access point 48 is located in such a position within a classroom, such as being ceiling-mounted, so that it is generally in a line of sight with all interior portions of the classroom and out of a line of sight from the interior portions of other classrooms. For example, a wireless audio access point 48 mounted on the ceiling of a first classroom 21, as shown in FIG. 2, should not be visible to an occupant of a second classroom 22.

The wireless audio access point 48 includes an infrared (IR) transmitter 483 and the RF wireless microphone 41 includes an infrared sensor 413. The infrared transmitter 483 is designed to periodically transmit a low baud rate infrared beacon signal 400. The RF wireless microphone 41 detects the presence of the wireless audio access point 48 within the same classroom by verifying that the wireless audio access point 48 is within a direct line of sight of the infrared sensor 413 by periodically receiving the infrared beacon signal 400.

A RF communication link 100 is established between the RF wireless microphone 41 and the wireless audio access point 48 as follows. First, the wireless audio access 48 point transmits an infrared beacon signal 400 containing an IR room code 401 from the infrared transmitter 483. Next, the RF wireless microphone 41 detects this infrared beacon signal 400 at the infrared sensor 413 and in response thereto transmits a RF inquiry 101. Finally, the wireless audio access point 483 responds with a RF inquiry response 102 using techniques known to those skilled in the art. In one embodiment, the IR room code 401 is particularly configured for facilitating pairing of the RF wireless microphone 41 and the wireless audio access point 48, such as by providing a RF address of the wireless audio access point 48 to the RF wireless microphone 41.

Those skilled in the art will recognize that the technique of using a low baud rate infrared beacon signal 400 including an IR room code 401 to establish a RF communication link 100, thereby avoiding having to remain discoverable to extraneous RF devices can be extended to other wireless communication systems and various other portable wireless devices.

The inventor has discovered that using a low baud rate infrared beacon signal 400 provides significant advantages as compared to high baud rate digital infrared communication, such as IrDA. These advantages include a greater optical range by allowing for both direct and indirect lines of sight, and low power consumption by the infrared transmitter 483. These advantages can be significantly enhanced by managing both the power level of the infrared transmitter and the duty cycle of the infrared transmitter 483, such as for example once every two (2) minutes. Suitable data rates for such a low baud rate infrared beacon signal 400 are between four hundred (400) baud and nine thousand six hundred (9600) baud with one thousand two hundred (1200) baud having been shown to provide satisfactory operational characteristics.

Figure 4:
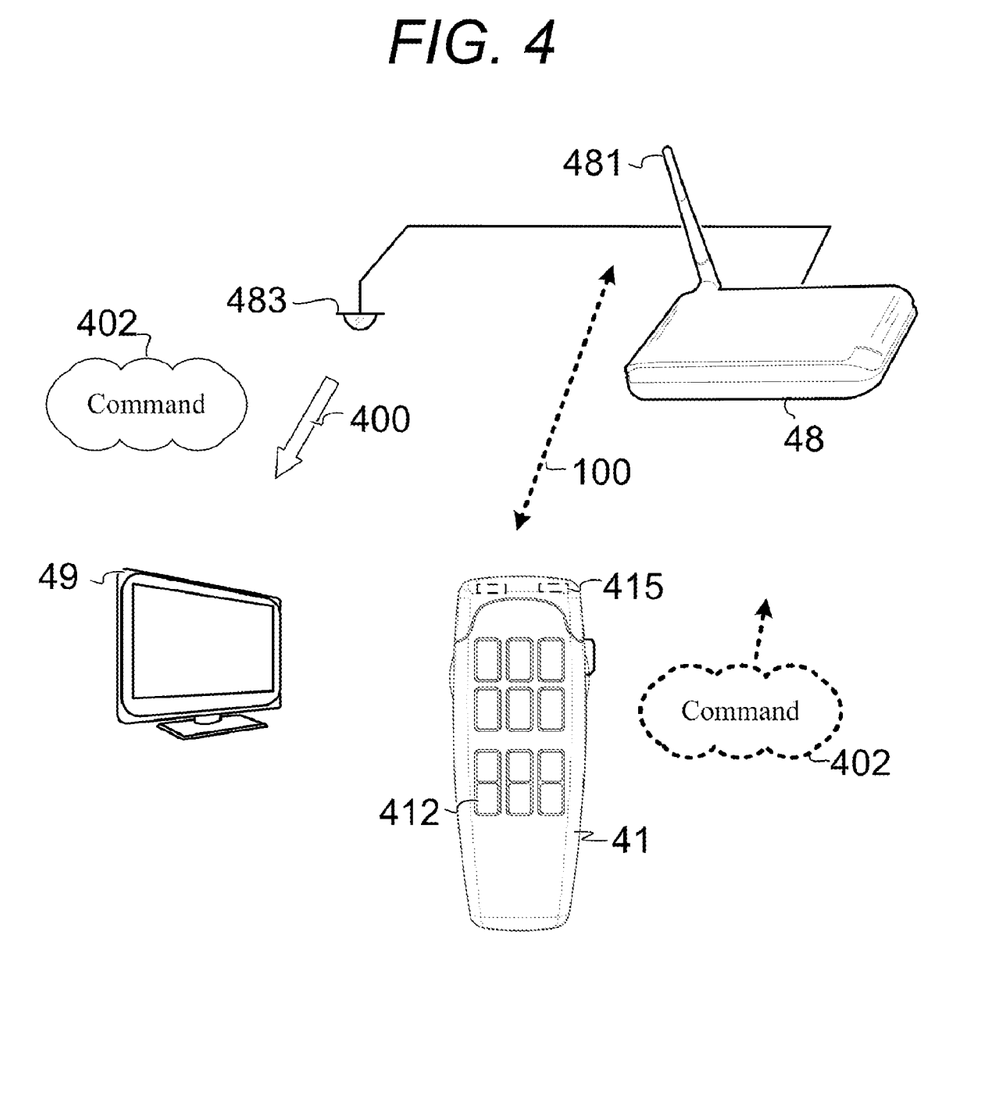
FIG. 4 depicts an embodiment of the classroom audio presentation of FIG. 3 in which the RF wireless microphone is capable of transmitting remote control commands to a controllable device via the wireless audio access point.

Refer to FIG. 4. In embodiments of the invention, the RF wireless microphone 41 further comprises remote control buttons 412 and is capable of transmitting remote control commands 402 over the RF communication link 100 to the wireless audio access point 40. In embodiments of the invention, the remote control commands 402 are suitable for controlling the wireless audio access point 40, such as audio-visual control.

In further embodiments of the invention, the remote control commands 402 are suitable for controlling a controllable device 49 collocated with the wireless audio access point 40. For example, the remote control commands 402 can be suitable for control of an audio visual controllable device, such as a television. In these embodiments, the infrared transmitter 483 of the wireless audio access point 40 is further configured for transmitting the remote control command 402 to the controllable device 49. For example, the RF wireless microphone 41 transmits the remote control command 402, such as a channel change command, to the wireless audio access point 40 over the RF communication link 100, the wireless audio access point 40 receives the remote control command 402 and transmits it to the controllable device 49, such as a television, as an IR signal from the infrared transmitter 483.

Figure 5:
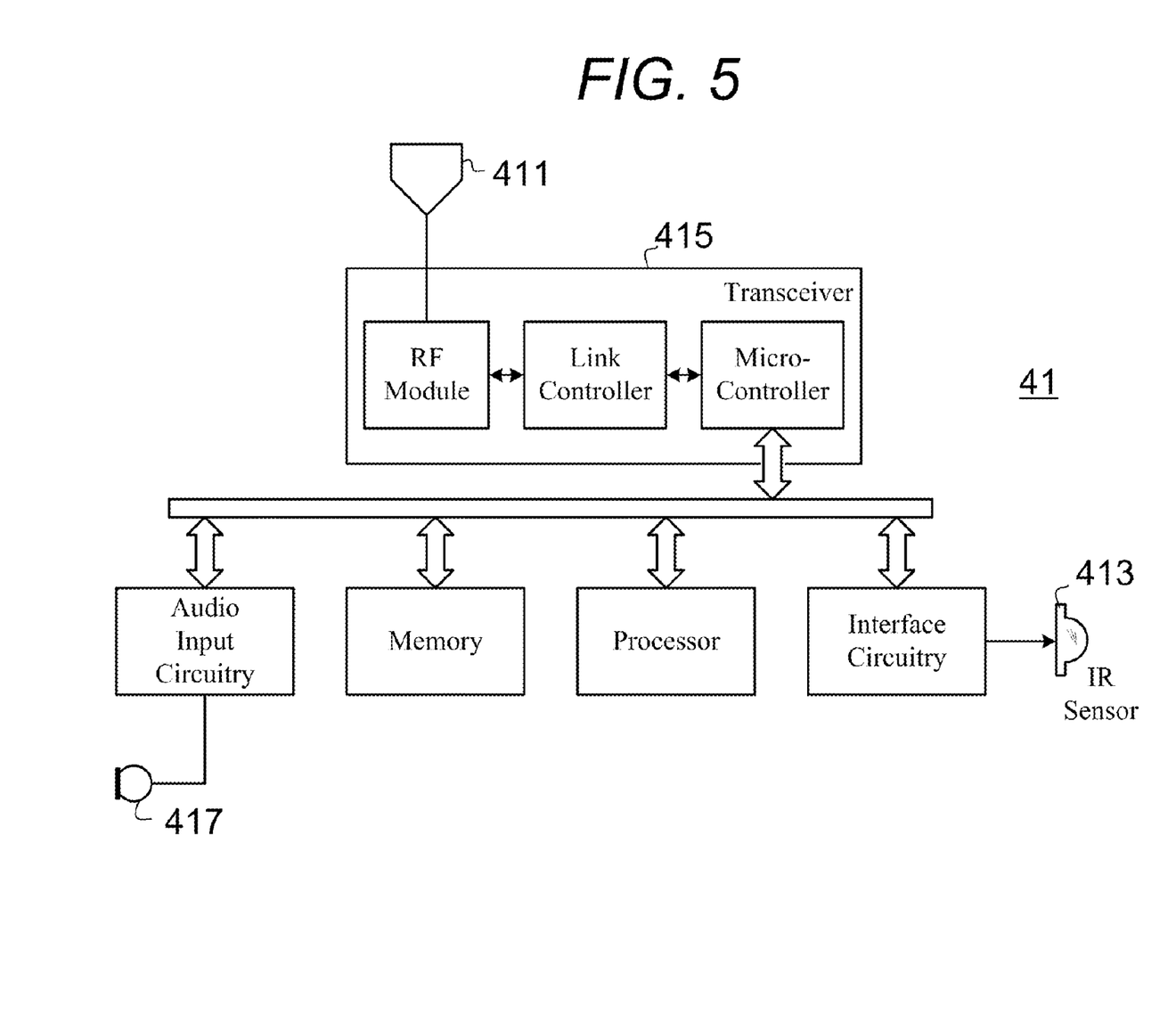
FIG. 5 illustrates further details for the RF wireless microphone of FIG. 3.

Refer to FIG. 5 which shows an exemplary block diagram of certain functional blocks within the RF wireless microphone 41. The primary functional blocks shown include a RF transceiver 415 and an infrared sensor 413. In addition to these functional blocks, the RF wireless microphone 41 includes an antenna 411 associated with RF transceiver 415, a microphone element 417 and associated audio input circuitry, and processing and memory elements typically found in modern electronic equipment.

Figure 6:
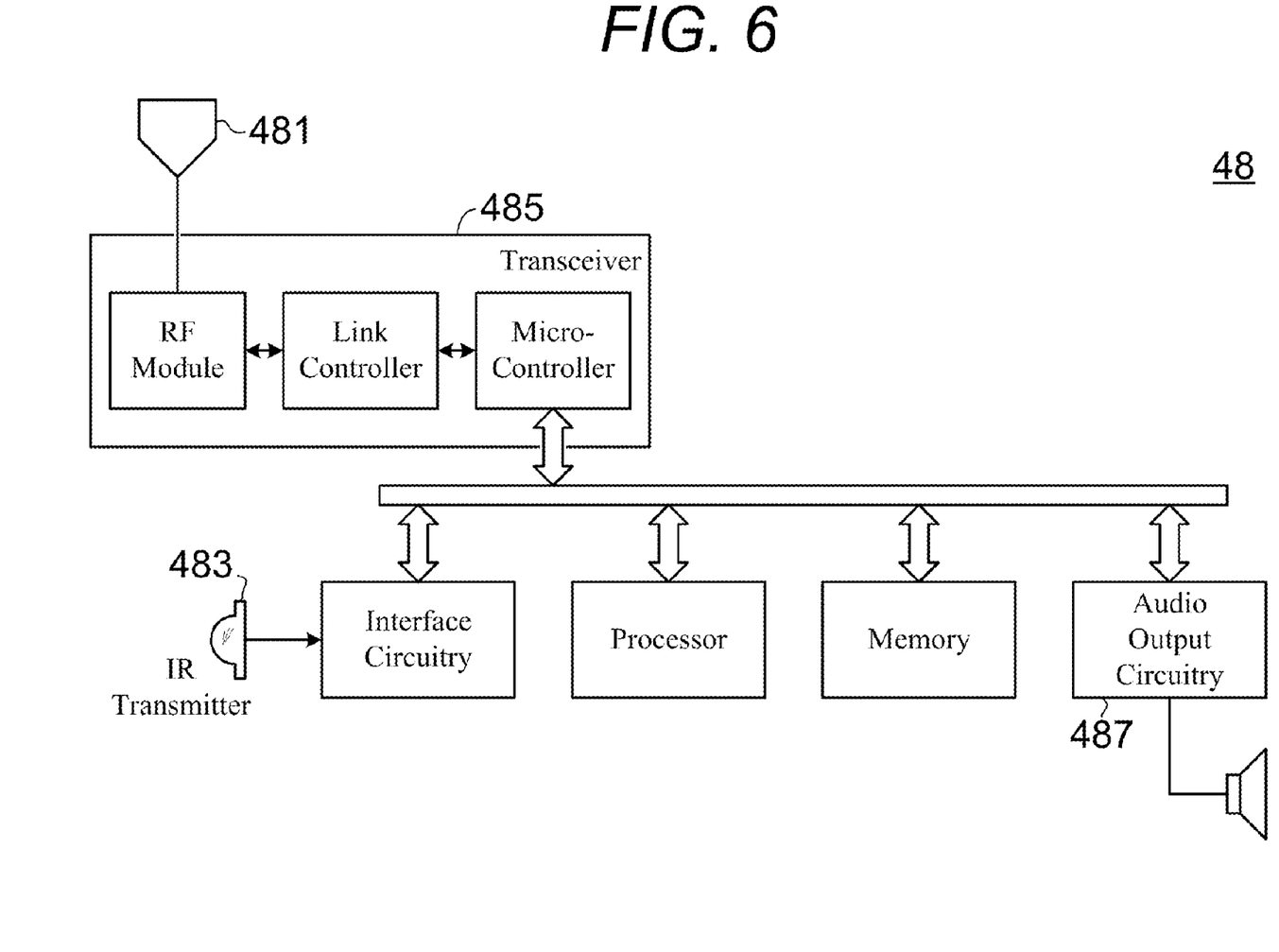
FIG. 6 illustrates further details for the wireless audio access point (i.e. wireless communication access point) of FIG. 3.

Refer to FIG. 6, which shows an exemplary block diagram of certain functional blocks within the wireless audio access point 48. The primary functional blocks shown include a RF transceiver 485 and an infrared transmitter 483 that provide the functionality previously described above. In addition to these functional blocks, the wireless audio access point 48 includes an antenna 481 associated with the RF transceiver 485, audio output circuitry 487, and processing and memory elements typically found in modern electronic equipment.

Figure 7:
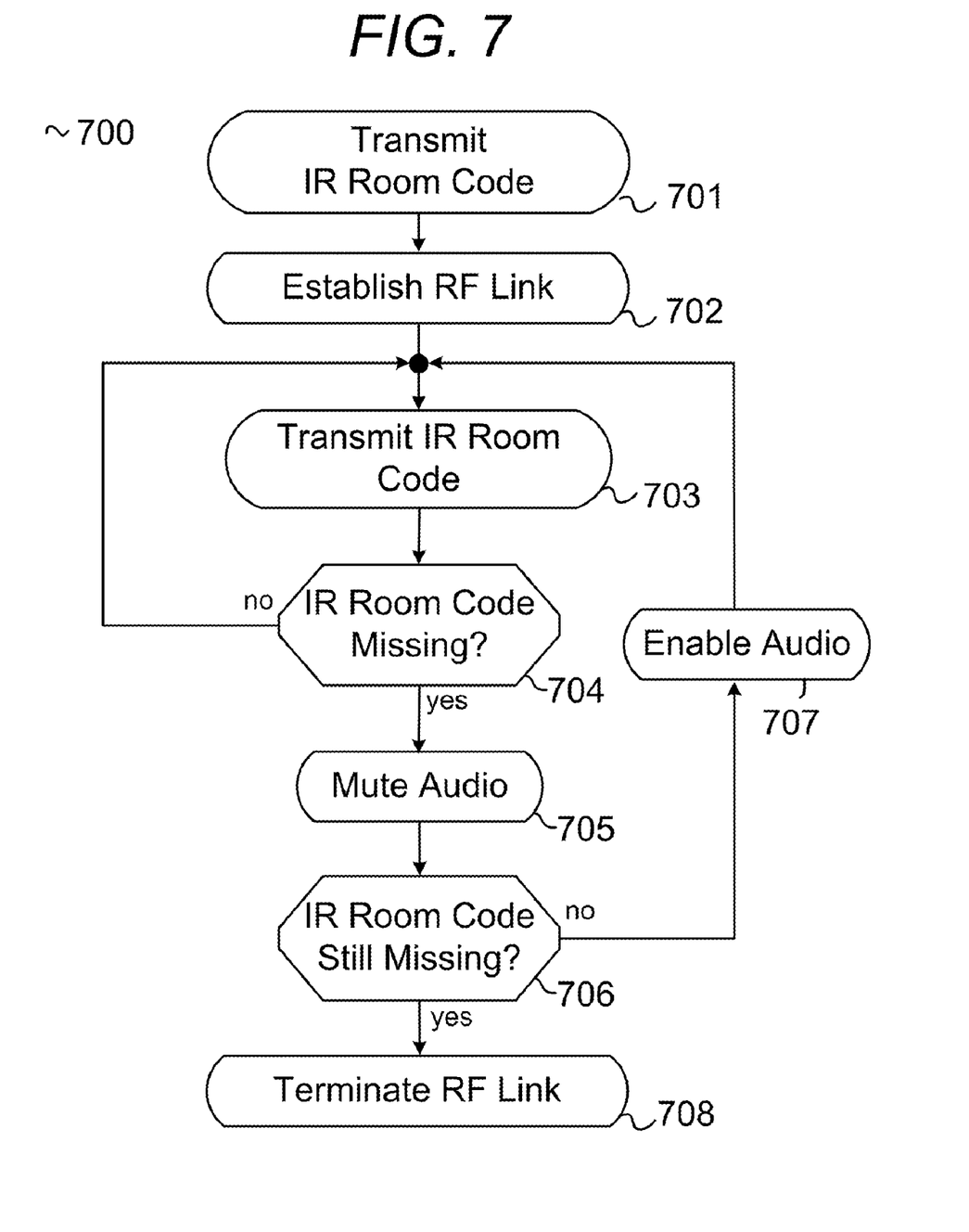
FIG. 7 is a flowchart of a process for intelligently connecting to a wireless access point and maintaining this connection based on the presence of an infrared beacon signal in accordance with one embodiment of the present invention.

FIG. 7 shows a process flowchart 700 for selectively communicating with a portable wireless device as it moves throughout a predefined area. In one illustrative embodiment, the portable wireless device is a RF wireless microphone and the predefined area is a portion of a school building. Those skilled in the art will recognize that the present invention is also suitable for use in other predefined areas, such as, but not limed to: conference centers and hotels. According to the present invention, the predefined area includes a number of wireless communication access points within the area.

Flowchart 700 includes processes of the present invention which, in one embodiment, are carried out by a processor and electrical components under the control of computer readable and computer executable instructions. The computer readable and computer executable instructions may reside, for example, in data storage features such as computer usable memory or in any other type of computer readable medium. Although specific steps are disclosed in flowchart 700, such steps are exemplary. That is, the present invention is well suited to performing various other steps or variations of the steps recited in FIG. 7. Within the present embodiment, it should be appreciated that the steps of flowchart 700 can be performed by software or hardware or any combination of software and hardware.

Refer to FIG. 7 and FIG. 3. According to an illustrative embodiment of the present invention, a RF communication link 100 is established between the portable wireless device 41 and the wireless communication access point 48 only after the wireless communication access point 48 has transmitted (step 701) an infrared beacon signal 400 comprising the IR room code 401 and the IR room code is received at the portable wireless device 41. Establishing the RF communication link 100 (step 702) entails the portable wireless device 41 transmitting a RF inquiry 101 and the wireless communication access point 48 transmitting a RF inquiry response 102. The inventor has discovered that it is advantageous to use an infrared beacon signal 400 with a low data rate, such as between four hundred (400) baud and nine thousand six hundred (9600) baud because this signal has a reasonable range for use within a single room and is reasonably low-powered, especially if transmitted at a low duty cycle. Those skilled in the art will recognize that the present invention generally selects a specific RF communication channel based on the content of the IR room code 401.

In one embodiment, the wireless communication access point 48 periodically transmits the infrared beacon signal 400 comprising the IR room code 401. Advantageously, due to the propagation nature of the infrared beacon signal 400, this allows the portable wireless device 41 to determine whether the wireless communication access point 48 is within the confines of the same room, such as a school classroom.

In embodiments of the present invention in which the portable wireless device is a RF wireless microphone 41 and the wireless communication access point is a wireless audio access point 48, it is desirable to mute the audio from the RF wireless microphone 41 when, for example, a teacher giving a lecture in a first classroom steps out of that classroom. Accordingly, to determine whether the RF wireless microphone 41 is still collocated in a room with the wireless audio access point 48, the wireless audio access point 48 continues to periodically transmits (step 703) the IR room code 401 after a RF communication link 100 has been established between the RF wireless microphone 41 and the wireless audio access point 48. If the IR room code 401 is not received at the wireless audio access point 48, and more specifically at the infrared sensor 483 shown in FIG. 6, in a first predefined period of time (condition 704), then the audio from the RF wireless microphone 41 is muted (step 705). Note that the associated RF communication link 100 is still active, however no audio data is being transmitted to the wireless audio access point 48.

Next, the RF wireless microphone 41 continues to wait for the wireless audio access point 48 to transmit the IR room code 401. In certain embodiments, the RF wireless microphone 41 will request that wireless audio access point 48 transmit the infrared beacon signal 400 at a 'high power' setting so that collocation can be determined even if the infrared transmitter 483 is not in a line of sight with the IR sensor.

If it is determined that the IR room code 401 is still missing after a second predefined time period (condition 706), then the RF communication link 100 is terminated (step 708). If however, the IR room code 401 is detected within the second predefined time period, then the audio from RF wireless microphone 41 is enabled (step 707).

Continuing with the above example, advantageously as the teacher walks throughout the predefined area with multiple wireless audio access points, the RF wireless microphone will establish RF communication with a wireless audio access point located in a classroom upon entering that classroom and terminate RF communication upon exiting the classroom.

In summary, embodiments of the present invention provide a user-friendly system and method for using a wireless microphone in multiple classrooms while monitoring whether the wireless microphone is collocated in a classroom with a wireless audio access point while preventing undesired or extraneous audio.

INDUSTRIAL APPLICABILITY

To solve the aforementioned problems, the present invention includes a method for intelligently selecting a communication access point from a plurality of available points.

LIST OF ACRONYMS USED IN THE DETAILED DESCRIPTION OF THE INVENTION

The following is a list of the acronyms used in the specification in alphabetical order.

| | |
|---|---|
| IEEE | Institute of Electronic and Electrical Engineers |
| IR | infrared |
| IrDA | Infrared Data Association |
| RF | radio frequency |
| SIG | special interest group |
| VoIP | voice-over internet protocol |

ALTERNATE EMBODIMENTS

Alternate embodiments may be devised without departing from the spirit or the scope of the invention. For example, certain embodiments may use digital RF communication protocols such as Bluetooth or Wi-Fi Direct or other audio transmission methods such as Voice over Internet Protocol (VoIP).

What is claimed is:

1. A wireless communication system comprising:
   (a) a wireless communication access point that further comprises
      (i) a radio frequency digital transceiver, and
      (ii) an infrared beacon transmitter configured for transmitting an infrared beacon signal at a data rate greater than or equal to 400 baud and less than or equal to 9600 baud, and an IR room code;
   (b) a portable wireless device that further comprises
      (i) a radio frequency digital transceiver configured for communicating with said radio frequency digital transceiver of said wireless communication access point, and
      (ii) an infrared sensor configured for receiving said infrared beacon signal; and
   (c) wherein the portable wireless device is configured for managing radio frequency digital communications based on said infrared beacon signal.

2. The wireless communication system of claim 1, wherein the portable wireless device is further configured for determining whether it is collocated in a room with the portable wireless device.

3. The wireless communication system of claim 1, wherein the infrared beacon signal has a data rate of 1200 baud.

4. The wireless communication system of claim 1, wherein the infrared beacon signal complies with RC-5 infrared protocol.

5. The wireless communication system of claim 1, wherein the infrared transmitter is configured for transmitting the IR room code periodically.

6. The wireless communication system of claim 5, wherein the radio frequency digital transceivers of said portable wireless device and said wireless communication access point establish mutual communication only after the IR room code is detected at the portable wireless device.

7. The wireless communication system of claim 6 wherein the IR room code is configured for facilitating RF pairing of the portable wireless device and the wireless communication access point.

8. The wireless communication system of claim 6 wherein:
   (a) the portable wireless device further comprises a microphone element and the radio frequency digital transceiver of said portable wireless device is further configured for transmitting audio; and
   (b) the wireless communication access point further comprises audio output circuitry and the radio frequency digital transceiver of said wireless communication access point is further configured for receiving audio.

9. The wireless communication system of claim 6, wherein the portable wireless device is further configured for muting an audio output upon a first predetermined condition of failing to receive said IR room code.

10. The wireless communication system of claim 9, wherein the portable wireless device is further configured for enabling an audio output upon a second predetermined condition of receiving said IR room code.

11. The wireless communication system of claim 6, wherein the portable wireless device further comprises remote control buttons.

12. The wireless communication system of claim 11, wherein the radio frequency digital transceiver of said portable wireless device is further configured for transmitting remote control commands.

13. The wireless communication system of claim 12, wherein the remote control commands are suitable for audio/visual control and further comprise: volume control; channel changing; and audio muting.

14. The wireless communication system of claim 13, wherein:
   (a) the radio frequency digital transceiver of the wireless communication access point is configured for receiving said remote control commands; and
   (b) the infrared transmitter of the wireless communication access point is further configured for transmitting the remote control commands to a controllable device.

15. A wireless audio distribution system suitable for use in a classroom setting, said system comprising:
   (a) a RF wireless microphone further comprising
      (i) a radio frequency transceiver,
      (ii) an infrared sensor, and
      (iii) a microphone element;
   (b) a wireless audio access point that further comprises
      (i) a radio frequency transceiver, and
      (ii) an infrared beacon transmitter;
   (c) wherein the infrared beacon transmitter is configured for periodically transmitting an IR room code;
   (d) wherein the RF wireless microphone and the wireless audio access point are further configured for
      (i) establishing mutual RF communication only after the IR room code is detected at the portable wireless device,
      (ii) terminating mutual RF communication upon a first predetermined condition of failing to receive said IR room code, and
      (iii) reestablishing mutual RF communication upon a second predetermined condition of receiving said IR room code; and
   (e) wherein the RF wireless microphone is further configured for
      (i) muting an audio output from said microphone element upon a third predetermined condition of failing to receive said IR room code, and
      (ii) enabling audio from said microphone element upon a fourth predetermined condition of receiving said IR room code.

16. The audio distribution system of claim 15 wherein:
   (a) the infrared beacon transmitter is configured for transmitting an infrared beacon signal at a data rate greater than 400 baud and less than or equal to 9600 baud; and
   (b) said IR room code is transmitted via said infrared beacon signal.

17. The audio distribution system of claim 15 wherein:
   (a) the radio frequency digital transceiver of said RF wireless microphone is further configured for transmitting a remote control command; and
   (b) the radio frequency digital transceiver of the wireless audio access point is further configured for receiving said remote control command and the infrared transmitter of the wireless audio access point is further configured for transmitting the remote control command to a corresponding controllable devices.

18. A method for selectively communicating with a portable wireless device capable of wireless reception and transmission on multiple RF communication channels as it moves throughout a predefined area, said method comprising the steps of:
   (a) providing said portable wireless device;
   (b) providing a plurality of a wireless communication access points located throughout the predefined area, with each one of said wireless communication access points
      (i) being located at a corresponding predetermined position,
      (ii) being capable of wireless reception and transmission on multiple RF communication channels, and
      (iii) being capable of transmitting IR codes;
   (c) transmitting a first IR room code from a first wireless communication access point to the portable wireless device, said first IR room code comprising an infrared beacon signal at a data rate of between 400 and 9600 baud;
   (d) selecting a first RF communication channel based on the contents of the first IR room code; and
   (e) establishing communication between the portable wireless device and said first wireless communication access point on the first RF communication channel.

19. The method according to claim 18, wherein the predefined area is a portion of a building selected from the group consisting of: conference centers, hotels, and schools.

20. The method according to claim 19, wherein each of said corresponding positions is a location within one of a plurality of rooms within said building.

21. The method according to claim 18, wherein the first wireless communication access point is configured for transmitting an infrared beacon signal at a data rate of 1200 baud.

22. The method according to claim 18 wherein the first wireless communication access point communicates with the portable wireless device using RC-5 infrared protocol.

23. The method according to claim 18 wherein the first IR room code is configured for facilitating communication between the portable wireless device and the first wireless communication access point over the first RF communication channel.

24. The method according to claim 18, wherein the step of transmitting the first IR room code from the first wireless communication access point is done periodically.

25. The method according to claim 24, further comprising the step of conditionally terminating communication over the first RF communication channel upon not receiving the first IR room code at said portable wireless device, within a first predetermined time period.

26. The method according to claim 25, further comprising the step of conditionally reestablishing communication over the first RF communication channel upon receiving the first IR room code at said portable wireless device, within a second predetermined time period.

27. The method according to claim 26, wherein the portable wireless device comprises a microphone.

28. The method according to claim 27, further comprising the step of conditionally muting audio from said microphone upon not receiving the first IR room code at said portable wireless device, within a third predetermined time increment.

29. The method according to claim 28, further comprising the step of conditionally enabling audio from said microphone upon receiving the first IR room code at said portable wireless device, within a fourth predetermined time increment.

30. A method for selectively distributing audio from a wireless microphone to an audio distribution component, said method comprising the steps of:
  (a) providing the wireless microphone, said wireless microphone
    (i) being capable of communicating over a RF communication channel including transmitting audio data, and
    (ii) being capable of receiving infrared beacon signals, and
  (b) providing the audio distribution component, said audio distribution component
    (i) being capable of communicating over the RF communication channel including being capable of receiving audio data,
    (ii) being capable of transmitting infrared beacon signals;
  (c) periodically transmitting an IR room code from the audio distribution component to the wireless microphone, said IR room code being particularly configured for facilitating communication between the wireless microphone and the audio distribution component over the RF communication channel;
  (d) establishing communication between the wireless microphone and the audio distribution component over the RF communication channel;
  (e) conditionally muting audio from said wireless microphone upon not receiving the IR room code at the wireless microphone, within a first predetermined time increment; and
  (f) conditionally enabling audio from said wireless microphone upon receiving the IR room code at the wireless microphone, within a second predetermined time increment.
  (g) conditionally terminating communication between the wireless microphone and the audio distribution component over the RF communication channel upon not receiving the IR room code at the wireless microphone, within a third predetermined time increment; and
  (h) conditionally reestablishing wireless RF communication between the wireless microphone and the audio distribution component upon receiving the IR room code at the wireless microphone, within a fourth predetermined time increment.

* * * * *